US012705822B2

(12) United States Patent
Hida

(10) Patent No.: US 12,705,822 B2
(45) Date of Patent: Aug. 11, 2026

(54) DYNAMIC MULTI-DIMENSIONAL MEDIA CONTENT PROJECTION

(71) Applicant: Fujitsu Limited, Kawasaki (JP)

(72) Inventor: Yusuke Hida, Pittsburgh, PA (US)

(73) Assignee: Fujitsu Limited, Kawasaki (JP)

( * ) Notice: Subject to any disclaimer, the term of this patent is extended or adjusted under 35 U.S.C. 154(b) by 37 days.

(21) Appl. No.: 18/597,671

(22) Filed: Mar. 6, 2024

(65) Prior Publication Data

US 2025/0285359 A1 Sep. 11, 2025

(51) Int. Cl.

*G06T 15/06* (2011.01)
*G06T 7/11* (2017.01)

(Continued)

(52) U.S. Cl.

CPC ................ *G06T 15/10* (2013.01); *G06T 7/11* (2017.01); *G06T 7/13* (2017.01); *G06T 7/194* (2017.01); *G06T 7/73* (2017.01); *G06T 15/06* (2013.01); *G06T 17/00* (2013.01); *G06V 10/82* (2022.01); *G06T 2207/10028* (2013.01); *G06T 2207/20081* (2013.01); *G06T 2207/20084* (2013.01); *G06T 2207/30244* (2013.01); *G06T 2210/12* (2013.01); *G06T 2210/32* (2013.01); *G06T 2210/56* (2013.01); *G06V 20/70* (2022.01)

(58) Field of Classification Search

CPC ... G06T 15/10; G06T 7/13; G06T 7/11; G06T 7/73; G06T 7/194; G06T 15/06; G06T 2207/10028; G06T 17/00; G06T 2207/20081; G06T 2207/30244; G06T 2207/20084; G06T 2210/12; G06T 2210/56; G06T 2210/32; G06V 10/82; G06V 20/70

See application file for complete search history.

(56) References Cited

U.S. PATENT DOCUMENTS 6,501,481 B1 * 12/2002 Wood ...................... G06T 15/04 345/581
2021/0375046 A1 * 12/2021 Shanmuganathan ........................ H04N 13/128

(Continued)

OTHER PUBLICATIONS

EESR—European Search Report mailed on Apr. 10, 2025 for European Patent Application No. 24220495.6 [12 pages].

(Continued)

*Primary Examiner* — Phi Hoang
(74) *Attorney, Agent, or Firm* — Fujitsu Intellectual Property Center; Tiep H. Nguyen

(57) ABSTRACT

In an embodiment, dynamic multi-dimensional media content is projected. Image data including 2D images depicting view of real-world is acquired. 3D polygons are detected corresponding to objects on a ground of the 2D images. 3D surface model is segmented into 3D segments including ground segments and non-ground segments. The ground segment of the 3D surface model is extracted by removing the one or more non-ground segments from the plurality of 3D segments. Corresponding information between 2D pixel coordinates in the 2D images and 3D surface coordinates of the ground segments is determined by applying a ray casting operation on the 2D images and the ground segment of the 3D surface model. The 3D polygons are projected onto the 3D surface model based on the correspondence information.

18 Claims, 10 Drawing Sheets

(51) Int. Cl.

| | |
|---|---|
| ***G06T 7/13*** | (2017.01) |
| ***G06T 7/194*** | (2017.01) |
| ***G06T 7/73*** | (2017.01) |
| ***G06T 15/10*** | (2011.01) |
| ***G06T 17/00*** | (2006.01) |
| ***G06V 10/82*** | (2022.01) |
| *G06V 20/70* | (2022.01) |

(56) References Cited

U.S. PATENT DOCUMENTS

2023/0267640 A1 8/2023 Chakravarty et al.
2025/0166375 A1* 5/2025 Williamson ........ G06F 3/04817

OTHER PUBLICATIONS

Zhan Song et al., "Vehicle Positioning and Ranging with Static Traffic Camera based on 2D-3D Tracking and Re-Projection", 2019 IEEE 21st International Workshop on Multimedia Signal Processing (MMSP), IEEE, Sep. 27, 2019 (Sep. 27, 2019), pp. 1-6, XP033660050, DOI: 10.1109/MMSP.2019.8901707.

Ratheesh Kalarot et al., "3D object tracking with a high-resolution GPU based real-time stereo", Image and Vision Computing New Zealand, ACM, 2 Penn Plaza, Suite 701 New York NY 10121-0701 USA, Nov. 26, 2012 (Nov. 26, 2012), pp. 394-399, XP058030014, DOI: 10.1145/24258362425912, ISBN: 978-1-4503-1473-2.

Shane Gilroy et al., "Overcoming Occlusion in the Automotive Environment—A Review", IEEE Transactions on Intelligent Transportation Systems, IEEE, Piscataway, NJ, USA,vol. 22, No. 1, Jan. 2021, pp. 23-35, XP011827374, ISSN: 1524-9050, DOI: 10.1109/TITS.2019.2956813.

* cited by examiner

| $w_{2D}$ | $h_{2D}$ | $x_{3D}$ | $y_{3D}$ | $z_{3D}$ |
|---|---|---|---|---|
| 0 | 0 | 0.1315 | 0.0235 | 0.5105 |
| 0 | 1 | 0.1315 | 0.0235 | 0.5131 |
| 990 | 990 | 0.6336 | 0.0315 | 0.3351 |

DYNAMIC MULTI-DIMENSIONAL MEDIA CONTENT PROJECTION

FIELD

The embodiments discussed in the present disclosure are related to dynamic multi-dimensional media content projection.

BACKGROUND

The 3D perspective in object detection may be based on its ability to provide a more complete understanding of real-world scenarios than 2D images. This may especially be useful in situations where a thorough investigation is required, such as a car accident. However, the widespread use of 2D monocular cameras, such as CCTVs, due to their low cost, impedes the full realization of 3D perspective's potential. A significant issue may arise from the previous method of projecting polygons onto the ground. This method may work well when the entire ground is visible to the 2D monocular cameras but fails to project them onto an invisible ground. This especially may be problematic in occlusion situations, where objects such as trees or traffic signals block the view.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include a set of operations which may include acquiring image data that may include 2D images depicting a view of a real-world location. The set of operations may further include detecting 3D polygons corresponding to objects on a ground region of the 2D images and acquisition of a 3D surface model of the real-world location. The 3D surface model may be segmented into multiple 3D segments comprising a ground segment and one or more non-ground segments. The ground segment of the 3D surface model may be extracted by removing the non-ground segments from a plurality of 3D segments. The set of operations may further include determining, by applying a ray casting operation on the 2D images and the ground segment of the 3D surface model, correspondence information between 2D pixel coordinates in the 2D images and 3D surface coordinates of the ground segment and projecting, based on the correspondence information, 3D polygons corresponding to the objects onto the 3D surface model.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
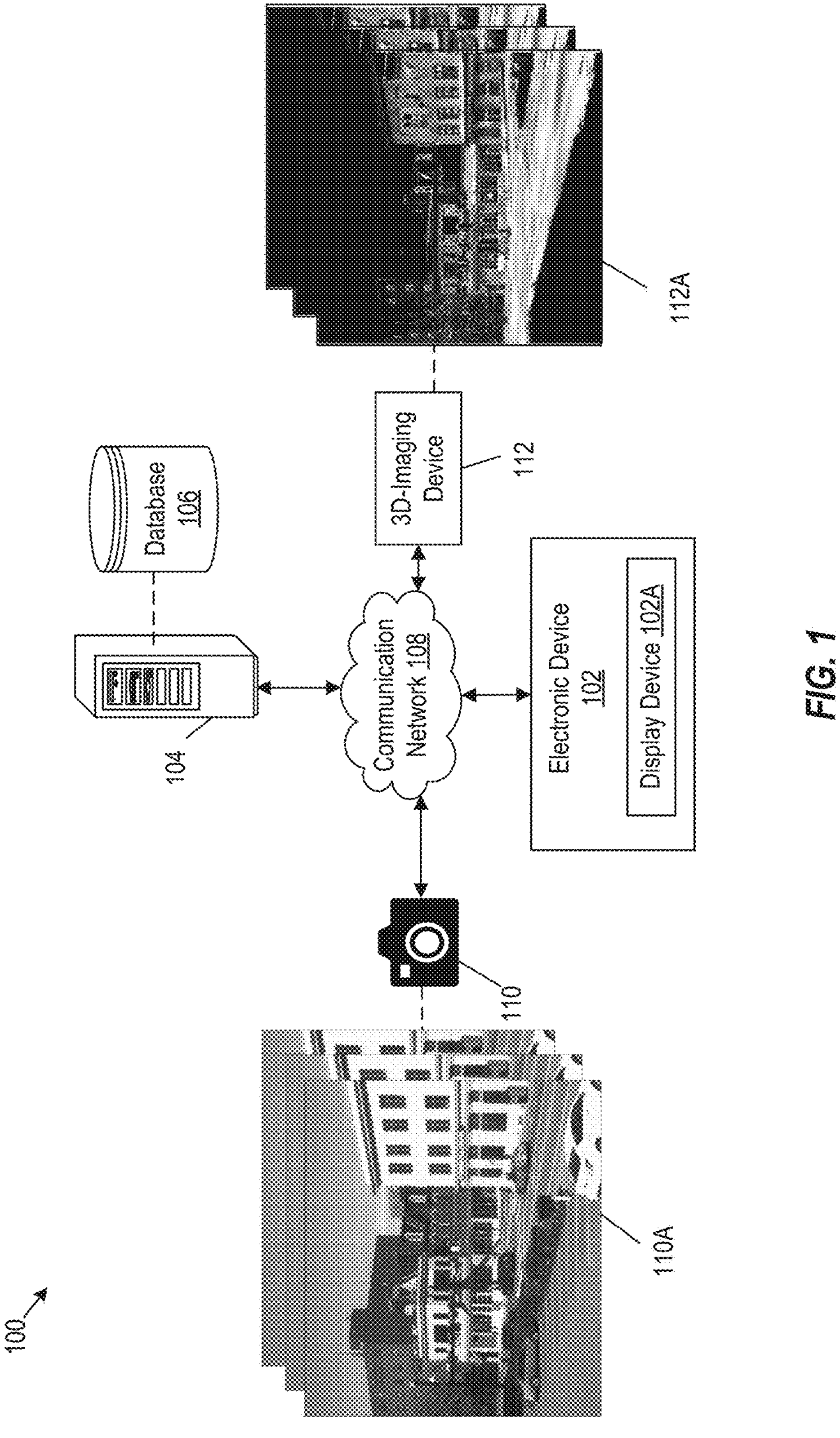
FIG. 1 is a diagram representing an example environment related to dynamic multi-dimensional media content projection.

Some embodiments described in the present disclosure relate to methods and systems for dynamic multi-dimensional media content projection. In the present disclosure, image data may be acquired. The image data may include 2-Dimensional (2D) images depicting a view of a real-world location. Thereafter, 3D polygons (e.g., a bounding box) may be detected corresponding to objects on a ground region of the 2D images. A 3-Dimensional (3D) surface model of the real-world location may be acquired for segmenting into a plurality of 3D segments include ground segments and one or more non-ground segments. Based on the segmented 3D surface model, the ground segment of the 3D surface model may be extracted by removing the one or more non-ground segments from the plurality of 3D segments. Correspondence information between 2D pixel coordinates in the 2D images and 3D surface coordinates of the ground segment may be determined, by applying a ray casting operation on the 2D images and the ground segment. One or more 3D polygons may be projected corresponding to the objects onto the 3D surface model.

According to one or more embodiments of the present disclosure, the technological field of 3D image generation and projection may be improved by configuring an electronic device in a manner that the electronic device is able to dynamically project multi-dimensional media content using correspondence information between 2D and 3D space coordinates. The electronic device may acquire image/video data that includes 2D images depicting a view of the real-world location. Further, the electronic device may detect 3D polygons corresponding to objects on a ground region of the 2D images. Based on the acquired 3D surface model of the real-world location, the 3D surface model may be segmented into the plurality of 3D segments comprising a ground segment and non-ground segments. The ground segment of the 3D surface model may be extracted by removing the non-ground segments from the plurality of 3D segments. Further, the electronic device may determine correspondence information between the 2D pixel coordinates in the 2D images and the 3D surface coordinates of the ground segment by applying the ray casting operation on the 2D images image and the ground segment. Based on the correspondence information, the electronic device may project the 3D polygons corresponding to the objects onto the 3D surface model.

Conventional techniques of 3D image projections may provide some benefits by comprehending real-world situations beyond the limitations of 2D images. The 3D perspectives may assist, for example, to visualize a vehicle accident from multiple angles to identify potential issues. It may be appreciated that generation of a 3D model from the 2D images may involve capturing the 2D images from different perspectives of the objects or an environment. The 2D images may be processed using a 3D model generation component, which generates 3D models based on the 2D images and the 3D data associated with them. Alternatively, a laser-based 3D scanning may be used to directly acquire a 3D surface model.

In conventional 3D object detection, a significant issue may arise in the approach of projecting polygons (e.g., bounding cubes) onto a ground surface. The method may work well when an entire ground is visible from an imaging device (e.g., 2D imaging device) but may fail to project them onto an invisible ground. This becomes particularly problematic in occlusion situations, where objects like trees or traffic signals may obstruct the view. The main challenge is to project such polygons onto a precise ground position, which may be required for accurate object detection. A sub-issue may arise when the polygons are unavailable or incorrectly detected, complicating the task even further. As a result, while the 3D perspectives may have the potential to improve object detection, these issues must be addressed before it can fully realize its benefits. In contrast, the present disclosure provides an approach which can precisely project polygons, from the 2D image to 3D space by introducing a correspondence table between the 2D pixel coordinates in the 2D images and the 3D surface coordinates, even if there are obstacles and the objects are partially obscured or invisible.

Embodiments of the present disclosure are explained with reference to the accompanying drawings.

FIG. 1 is a diagram representing an example environment related to dynamic multi-dimensional media content projection, arranged in accordance with at least one embodiment described in the present disclosure. With reference to FIG. 1, there is shown an environment 100. The environment 100 may include an electronic device 102, a server 104, a database 106, a communication network 108, a 2D imaging device 110, and a 3D imaging device 112. The electronic device 102, the server 104, the 2D imaging device 110, and the 3D imaging device 112 may be communicatively coupled to each other, via the communication network 108. The electronic device 102 may include a display device 102A. The server 104 may be communicatively coupled to a database 106. In FIG. 1, there is further shown a set of images 110A acquired by the 2D imaging device 110 and a 3D surface model 112A acquired by the 3D imaging device 112. The set of images (for example 2D images 110A and the 3D surface model 112A) may be stored in the database 106.

The set of images (for example, 2D images 110A) and 3D surface model 112A in FIG. 1 are presented merely as an example. The set of images may include N number of images, without deviation from the scope of the disclosure.

The 2D imaging device 110 (e.g., camera) and the 3D imaging device 112 (e.g., LIDAR) may be communicatively coupled to the electronic device 102. In some embodiments, the electronic device 102 may include the 2D imaging device 110 and the 3D imaging device 112.

The electronic device 102 may include suitable logic, circuitry, interfaces, and/or code that may be configured to project multi-dimensional media content, as described herein. In certain embodiments, the electronic device 102 may be configured to acquire the 2D images 110A and 3D surface model 112A, as shown in FIG. 1. Examples of the multi-dimensional media content may include, but are not limited to, 2D images 110A, 3D surface model 112A, 2D video, and 3D video. Examples of the electronic device 102 may include, but are not limited to, a mobile device, a desktop computer, a laptop, a computer workstation, an action camera, 360 cameras, a computing device, a mainframe machine, a gaming console, a virtual reality (VR) device, an augmented reality (AR) device, a mixed reality (MR) device, a mainframe machine, a computer workstation, an internet of things (IoT) device. In one or more embodiments, the electronic device 102 may include a user-end terminal device and a server communicatively coupled to the user-end terminal device. The electronic device 102 may be implemented using hardware including a processor or a microprocessor (e.g., to perform or control performance of one or more operations). In some other instances, the electronic device 102 may be implemented using a combination of hardware and software.

The server 104 may include suitable logic, interfaces, and/or code that may be configured to store neural network models (such as the object detection model, polygon estimation model 208B, 3D surface model 112A). The server 104 may be configured to retrieve from the database 106, historical data associated with the 3D polygons corresponding to objects in the 2D images 110A or the 3D surface model 112A. Each 3D polygon may enclose a corresponding object of the plurality of objects. The server 104 may be configured to estimate 3D polygons corresponding to the detected one or more objects in the 2D images 110A, based on the trained polygon estimation model 208B.

The database 106 may be stored or cached on a device, such as a server or the electronic device 102. The device storing the database 106 may be configured to receive a query for the data (e.g., the 2D images 110A and the 3D surface model 112A) from the electronic device 102. In response, the electronic device 102 of the database 106 may be configured to retrieve and provide the queried data to the electronic device 102 based on the received query. In some embodiments, the database 106 may be hosted on a plurality of servers stored at the same or different locations. The operations of the database 106 may be executed using hardware including a processor, a microprocessor (e.g., to perform or control performance of one or more operations), a field-programmable gate array (FPGA), or an application-specific integrated circuit (ASIC). In some other instances, the database 106 may be implemented using software.

The communication network 108 may include a communication medium through which the electronic device 102 may communicate with the server(s) or device(s) that may store the database 106, and the imaging devices (e.g., 2D imaging device 110 and 3D imaging device 112). Examples of the communication network 108 may include, but are not limited to, the Internet, a cloud network, a Wireless Fidelity (Wi-Fi) network, a Personal Area Network (PAN), a Local Area Network (LAN), a cellular network (such as, a Long-term evolution (or 4G) cellular network or a 5G cellular network), a satellite network (such as a network of low earth orbit satellites), and/or a Metropolitan Area Network (MAN)). Various devices in the environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

The server 104, the 2D imaging device 110, and the 3D imaging device 112 may be communicatively coupled via a wired or wireless network. In some embodiment, the electronic device 102 may incorporate the functionality of the server 104, the 2D imaging device 110, and the 3D imaging device 112.

The 2D imaging device 110 may include suitable logic, circuitry, and interfaces that may be configured to capture an image or a plurality of images of a real-world location that includes various objects (e.g., buildings, trees, roads, ground surface, traffic signals, people etc.). The 2D imaging device 110 may be further configured to capture 2D images 110A corresponding to real world locations. The 2D images 110A may be any digital data, which can be rendered, streamed, broadcasted, or stored on any electronic device 102 or storage. Examples of the 2D imaging device 110 may include, but are not limited to, an image sensor, a wide-angle camera, an action camera, a closed-circuit television (CCTV) camera, a camcorder, a camera with an integrated depth sensor, a cinematic camera, Digital Single-Lens Reflex (DSLR) camera, a Digital Single-Lens Mirrorless (DSLM) camera, a digital camera, camera phones, a time-of-flight camera (ToF camera), a night-vision camera, and/or other image capture devices.

The 3D imaging device 112 may include suitable logic, circuitry, and interfaces that may be configured to capture 3D data by performing a 3D scan of real-world objects (e.g., buildings, trees, roads, ground surface, traffic signals, people etc.). The 3D data (e.g., depth map or point cloud) may be converted to the 3D surface model 112A. Examples of the 3D imaging device 112 may include, but are not limited to, LiDAR, a time-of-flight camera (ToF camera), stereoscopic camera, structured-light 3D scanner, CT scanner. The 3D surface model 112A of the real-world location may be acquired from the 3D imaging device 112.

The 3D data may be collected from the 3D imaging device 112 to acquire the 3D surface model 112A of the real-world location (e.g., a street in a city). The 3D data may be any digital data, which can be rendered, streamed, broadcasted, or stored on any electronic device 102 or storage. Examples of the 3D data may include, but are not limited to, depth maps, 3D volumetric data, and point cloud data.

During operation, the electronic device 102 may acquire image data that includes the 2D images 110A depicting a view of a real-world location. The electronic device 102 may be configured to detect 3D polygons corresponding to objects on a ground region of the 2D images 110A. The electronic device 102 may be further configured to acquire the 3D surface model 112A of a real-world location from 3D data received at the 3D imaging device 112.

In at least one embodiment, the electronic device 102 may estimate initial camera pose parameters corresponding to an initial view of the 3D surface model 112A in a 3D space. The electronic device 102 may optimize the initial camera pose parameters to align a view of the 3D surface model 112A to a view of the 2D images 110A.

The electronic device 102 may be further configured to segment the 3D surface model 112A into a plurality of 3D segments comprising a ground segment and non-ground segments. The ground segment of the 3D surface model 112A may be extracted by removing the one or more non-ground segments from the plurality of 3D segments. By applying the ray casting operation on the 2D images 110A and the ground segment of the 3D surface model 112A, the electronic device 102 may be configured to determine correspondence information between 2D pixel coordinates in the 2D images 110A and 3D surface coordinates of the ground segment. By way of example, and not limitation, the correspondence information may be a correspondence table that may include 2D pixel coordinates of the 2D images 110A and the 3D surface coordinates corresponding to the 2D pixel coordinates. The electronic device 102 may be further configured to project, based on the correspondence information, one or more 3D polygons (e.g., a 3D cube/cuboid) corresponding to the objects onto the 3D surface model 112A.

The electronic device 102 may generate vertex information that includes a mapping of the 3D surface coordinates with vertices of the one or more 3D polygons. The electronic device 102 may further generate edge information that includes a mapping of the vertices to edges of the one or more 3D polygons. The projection may be performed based on the vertex information and the edge information. The vertex information may include a primary table that includes a vertex ID, and a polygon ID, a vertex type, and the 3D surface coordinates. The edge information may include a secondary table that includes the polygon ID, an edge ID, and IDs of edge vertices. The vertex type may include one of a ground or an object. Each 3D polygon of the one or more 3D polygons may enclose a corresponding object of the plurality of objects in a 3D space of the 3D surface model 112A.

In at least one embodiment, the electronic device 102 may retrieve, from a database, historical data associated with the 3D polygons corresponding to a plurality of objects in a set of images (e.g., 2D images 110A). Each 3D polygon of the plurality of 3D polygons encloses a corresponding object of the plurality of objects. The electronic device 102 may train the polygon estimation model 208B based on the historical data. During inference, the electronic device 102 may estimate the 3D polygons corresponding to the detected objects in the 2D images 110A, based on the trained polygon estimation model 208B. The electronic device 102 may project the detected 3D polygons onto the ground region of the 2D images 110A based on a determination that a difference between the estimated 3D polygons and the detected 3D polygons is less than a predefined threshold. Alternatively, the electronic device 102 may project the estimated 3D polygons onto the ground region of the 2D images 110A based on the determination that a difference between the estimated 3D polygons and the detected 3D polygons is greater than the predefined threshold. Details related to the historical data and the behavioral data are further provided, for example, in FIG. 4 (at 402, 412).

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the electronic device 102 but not the database 106. In addition, in some embodiments, the functionality of each of the database 106 may be incorporated into the electronic device 102, without a deviation from the scope of the disclosure.

Figure 2:
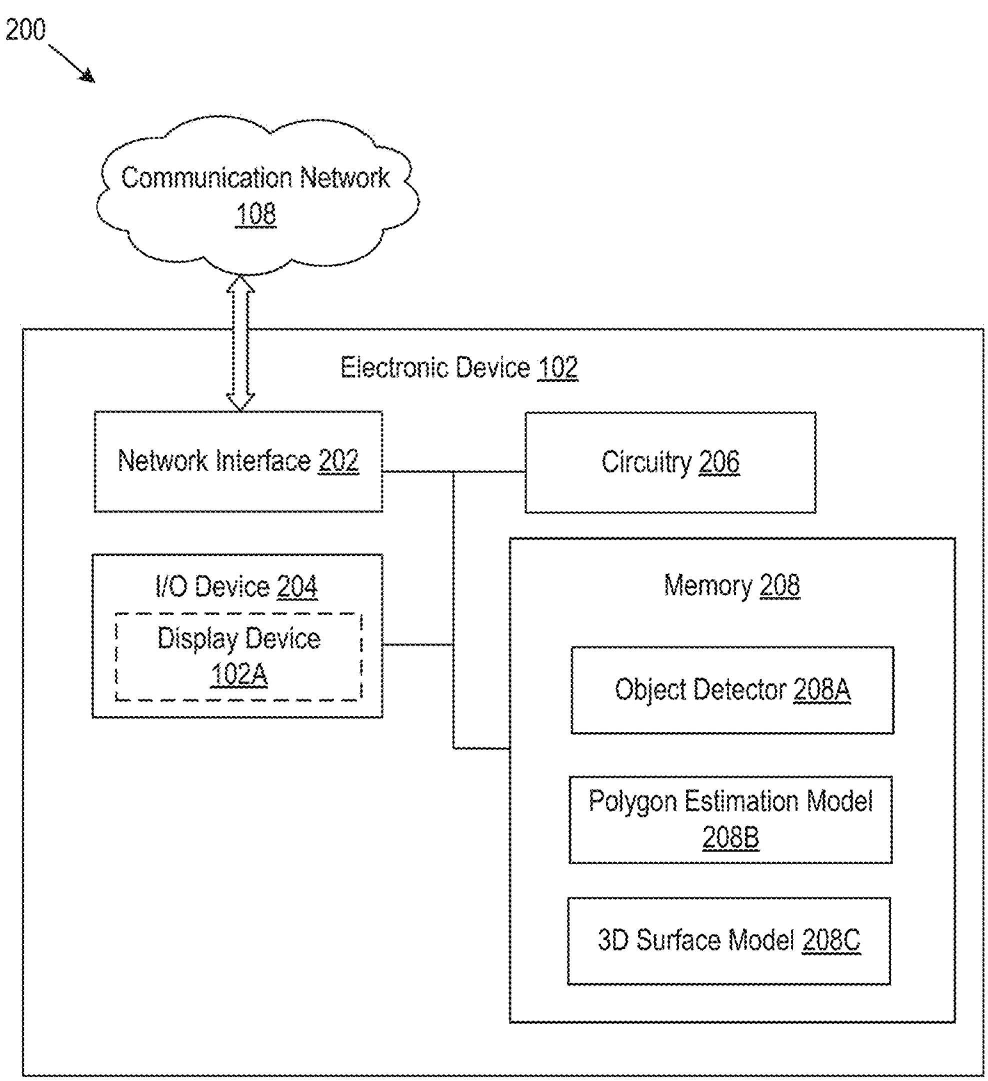
FIG. 2 is a block diagram that illustrates an exemplary electronic device for dynamic multi-dimensional media content projection.

FIG. 2 is a block diagram that illustrates an exemplary electronic device 102 for dynamic multi-dimensional media content projection, arranged in accordance with at least one embodiment described in the present disclosure. FIG. 2 is explained in conjunction with elements from FIG. 1. With reference to FIG. 2, there is shown a block diagram 200 of the electronic device 102. The electronic device 102 may include network interface 202, an input/output (I/O) device 204, a circuitry 206, and a memory 208. The I/O device may include a display device 102A. The memory may include an object detector 208A, a polygon estimation model 208B, a 3D surface model 208C.

The network interface 202 may comprise suitable logic, circuitry, interfaces, and/or code that may be configured to establish a communication between the electronic device 102, the server of the database 106, the 2D imaging device 110, and the 3D imaging device 112, via the communication network 108. The network interface 202 may be implemented by use of various known technologies to support wired or wireless communication of the electronic device 102, via the communication network 108. The network interface 202 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The I/O device 204 may include suitable logic, circuitry, interfaces, and/or code that may be configured to receive a user input. For example, the I/O device 204 may display image data (e.g., the 2D images 110A) and the 3D surface model 112A captured using the 2D imaging device 110 and the 3D imaging device 112, respectively. The I/O device 204 may project the 3D polygons corresponding to the objects onto the 3D surface model 112A. The I/O device 204 may include various input and output devices, which may be configured to communicate with the circuitry 206 and other components, such as the network interface 202. Examples of the input devices may include, but are not limited to, a touch screen, a keyboard, a mouse, a joystick, and/or a microphone. Examples of the output devices may include, but are not limited to, a display (e.g., the display device 102A) and a speaker.

The circuitry 206 may include suitable logic, circuitry, and/or interfaces that may be configured to execute program instructions associated with different operations to be executed by the electronic device 102. For example, some of the operations may include the acquisition of the image data, detection of the 3D polygons, segmentation of 3D surface model 208C, extraction of the ground segment and non-ground segment, determination of correspondence information and projection of the 3D polygons. The circuitry 206 may include any suitable special-purpose or general-purpose computer, computing entity, or processing device including various computer hardware or software modules and may be configured to execute instructions stored on any applicable computer-readable storage media. For example, the circuitry 206 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 2, the circuitry 206 may include any number of processors configured to, individually or collectively, perform or direct performance of any number of operations of the electronic device 102, as described in the present disclosure. Additionally, one or more of the processors may be present on one or more different electronic devices, such as different servers. In some embodiments, the circuitry 206 may be configured to interpret and/or execute program instructions and/or process data stored in the memory 208. In some embodiments, the circuitry 206 may fetch program instructions from the memory 208 and load the program instructions in the memory 208. After the program instructions are loaded into the memory 208, the circuitry 206 may execute the program instructions. Some of the examples of the circuitry 206 may be a Graphics Processing Unit (GPU), a Central Processing Unit (CPU), a Reduced Instruction Set Computer (RISC) processor, an ASIC processor, a Complex Instruction Set Computer (CISC) processor, a co-processor, and/or a combination thereof.

The memory 208 may include suitable logic, circuitry, interfaces, and/or code that may be configured to store program instructions executable by the circuitry 206. In certain embodiments, the memory 208 may be configured to store operating systems and associated application-specific information. The memory 208 may include computer-readable storage media for carrying or having computer-executable instructions or data structures stored thereon. Such computer-readable storage media may include any available media that may be accessed by a general-purpose or special-purpose computer, such as the circuitry 206 By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the circuitry 206 to perform a certain operation or group of operations associated with the electronic device 102. The memory 208 may include various models, but not limited to the object detector 208A, the polygon estimation model 208B, the 3D surface model 208C. The various models are described in detail in FIG. 3, FIG. 5, FIG. 8, and FIG. 9.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the circuitry 206 to perform a certain operation or group of operations associated with the electronic device 102.

The object detection (using the object detector 208A) may be achieved through semantic segmentation, where different regions in the image (e.g., 2D image 110A) are defined and labeled based on the real-life objects (e.g., vehicle, people, buildings etc.) they depict. The resulting objects detection may then be used to generate point features that may be placed on the map. In an exemplary scenario, a user walking on a footpath may appear in the image (e.g., 2D image 110A), The user may be considered as the object. The objects may be static objects or dynamic objects. In a dynamic sequence of images, few of the images may include occlusions which partially or fully occlude the object. The object detection may be useful for many applications, such as but not limited to, security, surveillance, face recognition, autonomous driving, and robotics. The circuitry 206 may detect and track pedestrians, vehicles, and traffic signs on a busy street. This can help improve road safety, traffic management, and navigation. Based on the object detection in 2D images 110A, algorithm may be enabled for differentiating objects from background. The polygons may also handle occlusion, as they can accurately label only the visible parts of occluded objects.

The polygon estimation model 208B may be a neural network or computational network or a system of artificial neurons, arranged in a plurality of layers, as nodes. During inference, the polygon estimation model 208B may process input images to localize objects across the 2D images (e.g., the 2D images 110A) by extracting behavioral data associated with movement or appearance of such objects. The plurality of layers of the neural network may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from hyper-parameters of the neural network. Such hyper-parameters may be set before or after training the neural network on a training dataset.

Each node of the neural network in the polygon estimation model 208B may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to same or a different same mathematical function.

In training of the neural network of the polygon estimation model 208B, one or more parameters of each node of the neural network may be updated based on whether an output of the final layer for a given input (from the training dataset) matches a correct result based on a loss function for the neural network. The above process may be repeated for same or a different input until a minima of loss function is achieved, and a training error is minimized. Several methods for training are known in art, for example, gradient descent, stochastic gradient descent, batch gradient descent, gradient boost, meta-heuristics, and the like.

Examples of the polygon estimation model 208B may be a neural network based model, such as but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks. In certain embodiments, the neural network-based polygon estimation model 208B may be based on a hybrid architecture of multiple Deep Neural Networks (DNNs).

The 3D surface model 208C may be a digital representation of features, either real or hypothetical, in three-dimensional space. Some examples of 3D surfaces may be landscape, an urban corridor, gas deposits under the earth, and a network of well depths and the like to determine water table depth. The 3D surface model 208C can be created from a variety of data sources, such as points, lines, polygons, or images, using interpolation or triangulation methods. The 3D surface model 208C can be used for various applications, such as determining mass properties, checking interference, generating cross-sections, and creating finite element meshes and the like.

In some embodiments, the 3D surface model 208C may be obtained from the 3D imaging device 112 (e.g., LiDAR) or the 3D surface may be generated based on the point cloud data (for example, 602). The captured point cloud data may be converted to a 3D surface model 208C (or 3D mesh with or without color/texture).

The display device 102A may comprise suitable logic, circuitry, interfaces, and/or code that may be configured to display the information of the image data (e.g., the 2D images 110A) and the 3D data captured using the 2D imaging device 110 and the 3D imaging device 112, respectively. The display screen 212 may be configured to receive the user inputs (e.g., for projection of the 3D surface model 112A) from the user 114. In such cases the display device 102A may be a touch screen to receive the user inputs. The display device 102A may be realized through several known technologies such as, but not limited to, a Liquid Crystal Display (LCD) display, a Light Emitting Diode (LED) display, a plasma display, and/or an Organic LED (OLED) display technology, and/or other display technologies.

Modifications, additions, or omissions may be made to the example electronic device 102 without departing from the scope of the present disclosure. For example, in some embodiments, the example electronic device 102 may include any number of other components that may not be explicitly illustrated or described for the sake of brevity. The object detector 208A, polygon estimation model 208B, and 3D surface model 208C are described in FIG. 3, FIG. 4, FIG. 5, and FIG. 9.

Figure 3A:
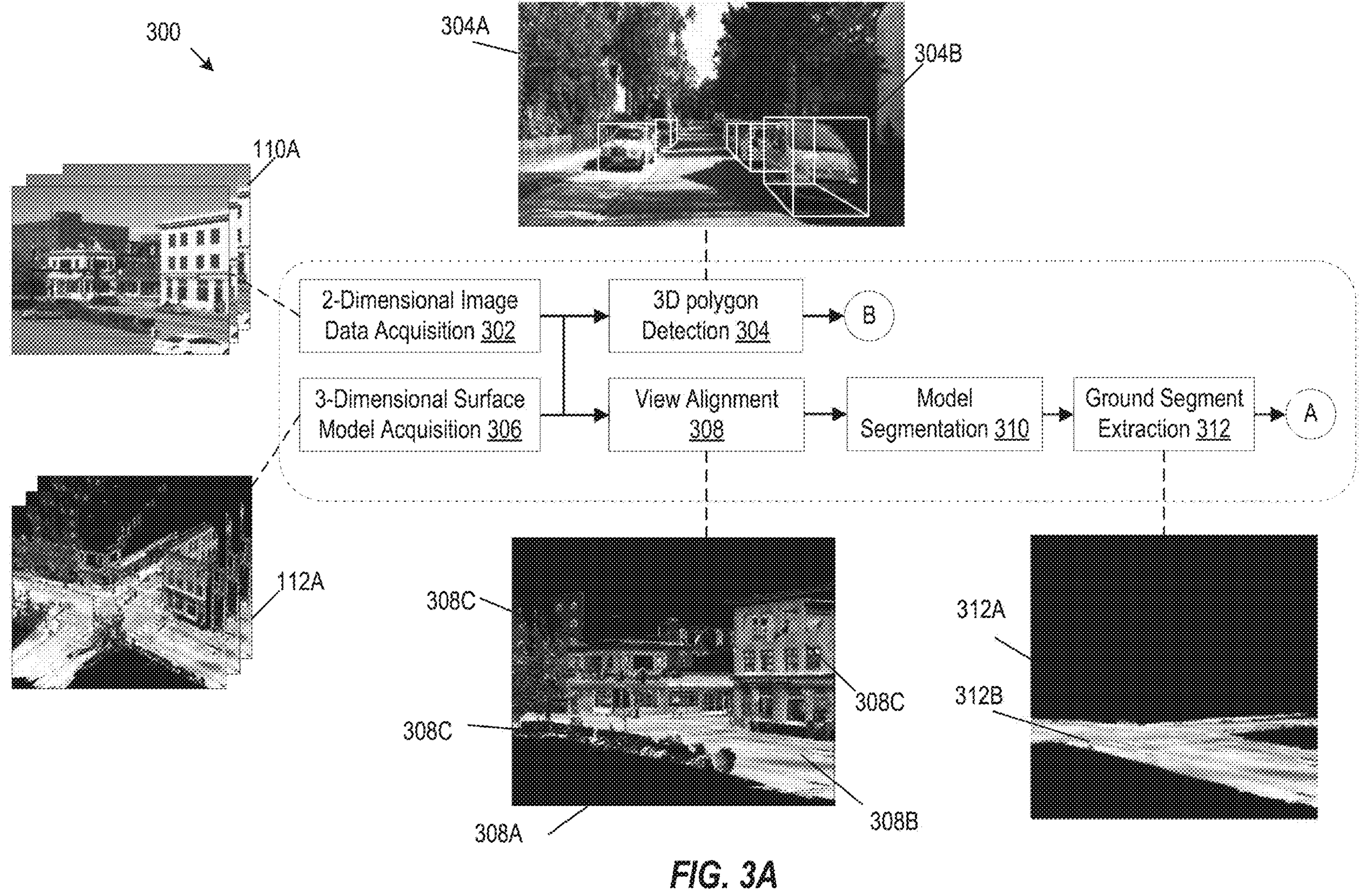
FIG. 3A is a diagram that illustrates an execution pipeline for object detection and ground segmentation in dynamic multi-dimensional media content projection.
Figure 3B:
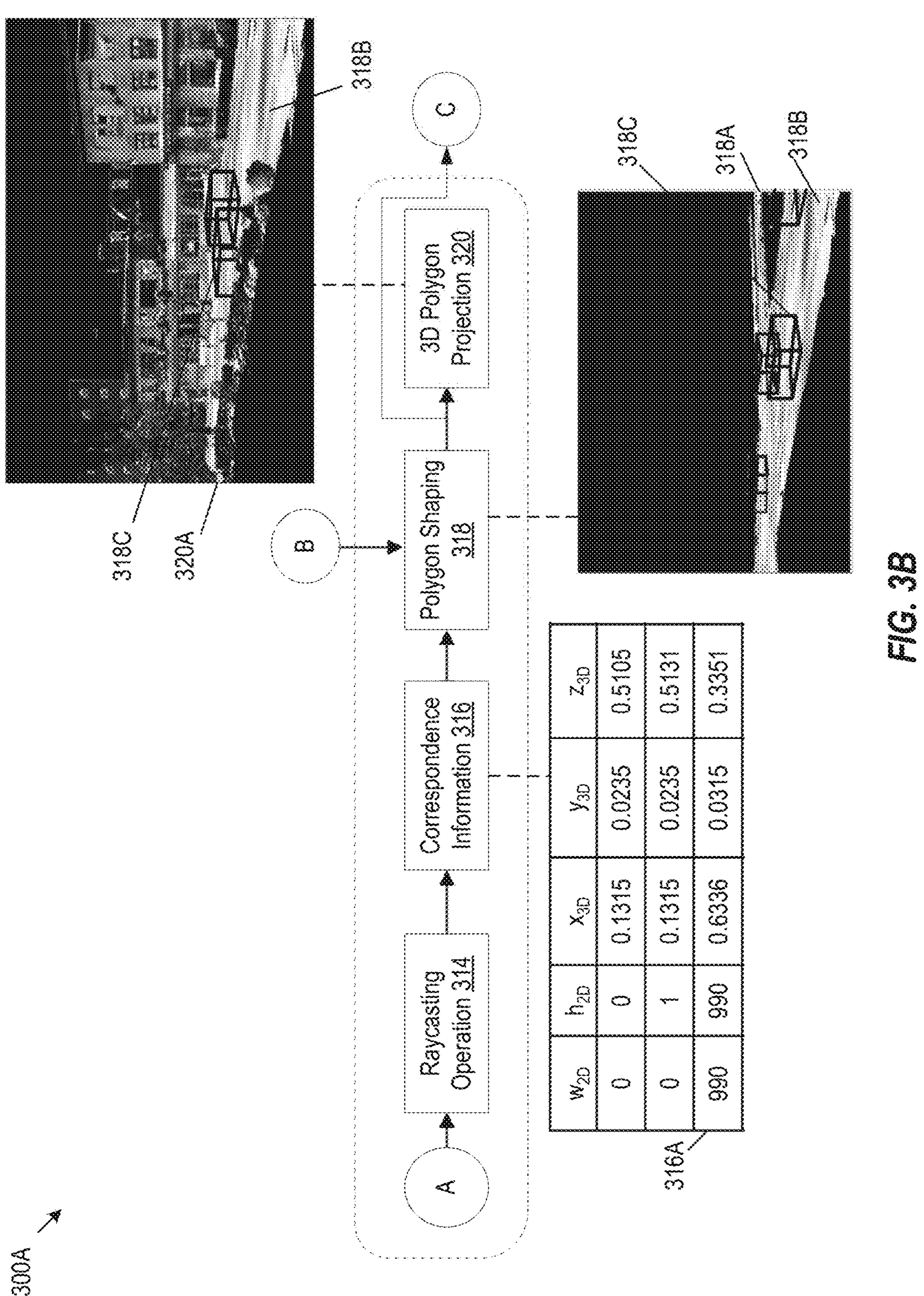
FIG. 3B is a diagram that illustrates an execution pipeline for determining correspondence information for dynamic multi-dimensional media content projection.

FIGS. 3A and 3B are diagrams that collectively illustrate an execution pipeline for dynamic multi-dimensional media content projection, in accordance with an embodiment of the disclosure. FIG. 3A and FIG. 3B are described in conjunction with elements from FIG. 1 and FIG. 2. With reference to FIG. 3A and FIG. 3B, there is shown an execution pipeline 300. The exemplary execution pipeline 300 may include a set of operations that may be executed by one or more electronic components, such as the electronic device 102 of FIG. 1. The operations may include image data (e.g., 2D images 110A) acquisition, 3D model acquisition (e.g., 3D surface model 112A), polygons detection (e.g., 3D polygons), 3D surface model segmentation, ground segment extraction, correspondence information determination, and 3D polygon projection. The set of operations may be performed by the electronic device 102 for dynamic multi-dimensional media content projection, as described herein.

At 302, an operation for 2D image acquisition may be executed. In an embodiment, the circuitry 206 may be configured to receive image data that includes the 2D images 110A. The 2D images 110A may be any digital data, which can be rendered in 2D, streamed, broadcasted, or stored on any electronic device 102. For example, the circuitry 206 may receive the image data from the imaging device (for example, the 2D imaging device 110). The 2D images 110A may include objects, such as vehicles, ground surface, buildings, roads, poles, and people. In an embodiment, the 2D images 110A may be pre-stored in the memory 208 and the circuitry 206 may retrieve the pre-stored image data 110A from the memory 208.

At 304, an operation for 3D polygon detection may be executed. The objects may be static objects, dynamic objects, or a combination thereof. As part of the operation, the circuitry 206 may detect one or more 3D polygons (e.g., a 3D polygon 304B) corresponding to one or more objects (e.g., a car) on a ground region of the 2D images 110A. By way of example, and not limitation, the 3D polygon 304B may be a bounding cube/cuboid which may enclose an object in the images (such as a 2D images shown in 304A). Alternatively, the 3D polygons 304B may be of any suitable shape, without a departure from the scope of the present disclosure.

In an embodiment, the detection may be performed using a neural network-based object detector (e.g., the object detector 208A) that may identify and label different regions in the 2D images 304A based on real-life objects included in such regions. In order to localize the objects, a 3D polygon 304B may be placed around each object. As an example, the 2D images 110A of a street may be considered. The detected objects may be, for example, streetlights, vehicles, people, buildings, traffic signals, roads, trees, and the like. The resulting object detections may be used to generate features that may be placed on the map. Consider an exemplary scenario of the 2D images 304A where a vehicle appears parked in a street. The vehicle may be considered as the object that may be detected by the object detector 208A. The 3D polygon 304B (a 3D cube, for example) may be placed to enclose the vehicle based on results generated by the object detector 208A. In some instances, the 2D images 304A may also include occlusions (not shown) which may fully or partially occlude the detected object.

At 306, an operation for the 3D surface model 112A acquisition may be executed. In an embodiment, the circuitry 206 may be configured to receive the 3D surface model 112A that includes 3D mesh or point data. The 3D surface model 112A may be any digital content, which can be rendered in 3D, streamed, broadcasted, and stored on any electronic device. The 3D surface model 112A may be generated from 3D data, such as depth maps, 3D volumetric data, and point cloud data.

The circuitry 206 may receive the 3D data from the imaging device (for example 3D imaging device 112), which may correspond to objects in the 2D images 110A. The objects may be vehicles, ground surface, buildings, people, and the like. In another embodiment, the 3D data may be collected from the 3D imaging device 112 and processed to acquire the 3D surface model 112A of the real-world location (e.g., a street in a city). In another embodiment, the 3D data may be pre-stored in the memory 208 and the circuitry 206 may retrieve the pre-stored 3D data from the memory 208.

At 308, an operation for view alignment may be executed. The view alignment of the acquired 3D surface model 112A may include estimation of initial pose parameters corresponding to an initial view of the 3D surface model 112A in the 3D space. The initial camera pose parameters may be optimized to align the view of the 3D surface model 112A to a view of the 2D images 110A. The real-world locations and the 3D surface model 112A may have different coordinates. The real-world locations use longitude and latitude, while the 3D surface model 112A uses x, y, z axis. This makes it hard to get the precise location and orientation of a fixed camera. Therefore, in order to align the views of the 2D images 110A and 3D surface model 112A, values such as location, angle, and zoom may be adjusted. The initial pose parameters corresponding to initial view of the 3D surface model 112A may be optimized to align the view of the 3D surface model 112A in the 3D space to obtain aligned 3D surface model 308A. The aligned 3D surface model 308A may include the ground segment 308B and non-ground segments 308C. For example, the aligned 3D surface model 308A shows a set of buildings (i.e., the non-ground segments 308C) as part of the 3D surface model 112A. The camera pose estimation is further described in FIG. 8.

At 310, the aligned 3D surface model 308A may be segmented into 3D segments including ground segment 308B and non-ground segments 308C. The segmentation may be performed on the aligned 3D surface model 308A by dividing the aligned 3D surface model 308A into regions or segments based on criteria, such as color, texture, shape, or semantic meaning (semantic segmentation). In an embodiment, the circuitry 206 may identify and label the objects or parts of a 2D image. For example, the object detector 208A may locate and identify the objects in the image by drawing bounding boxes around them and assigning class labels, such as 'car', 'person', 'road', or 'dog'. Based on the labeled objects or parts of the image, the aligned 3D surface model 308A may be segmented as the ground segment 308B and non-ground segments 308C.

The semantic segmentation of the aligned 3D surface model 308A may include assignment of a class label to each point in the aligned 3D surface model 308A, such as 'car', 'road', 'sky', etc. The semantic segmentation may not differentiate between instances of the same class, such as multiple cars in the same image. The instance segmentation may distinguish between instances of the same class, such as multiple cars in the same aligned 3D surface model 308A. The panoptic segmentation may combine semantic and instance segmentation by assigning a class label and an instance ID to each point on the aligned 3D surface model 308A, but also grouping points that belong to the same semantic region, such as 'road 1' or 'sidewalk 1'. This type of segmentation may provide a comprehensive and coherent representation of the aligned 3D surface model 308A.

In some embodiments, various techniques, and algorithms, such as but not limited to, thresholding, clustering, edge detection, region growing, graph-based methods, or deep learning models may be used to perform segmentation. The deep learning models, such as but not limited to, convolutional neural networks (CNNs), U-Net, Mask R-CNN, DeepLab, and so on. The CNN architecture that consists of an encoder-decoder structure, where the encoder may reduce the spatial resolution of the input image and extracts high-level features, while the decoder may increase the spatial resolution and may generate the output segmentation map.

At 312, extraction of a ground segment 308B from the aligned 3D surface model 308A may be performed by removing the non-ground segments 308C from the 3D segments. For example, a segmented image 312A depicts a ground segment 312B (i.e., roads).

At 314, the ray casting operation may be performed. The ray casting operation may be performed on the 2D images 110A and the ground segment 308B of the 3D surface model 112A. Using the 3D surface model 112A, each pixel of a 2D image may be assigned a 3D coordinate in 3D space based on the perspective projection formula. As an example, the image size of the 2D images 110A may be extracted and a 2D coordinate may be selected from 2D pixel coordinates. The ray casting operation may be applied on the selected 2D coordinate to estimate a corresponding 3D surface coordinate on the ground segment 308B in the 3D space. The above operation may be repeated for all the pixels of the 2D image. The correspondence information may be determined based on the 2D pixel coordinate and the 3D surface coordinate.

At 316, correspondence information between the 2D pixel coordinates in the 2D images 110A and 3D surface coordinates of the ground segment 308B may be determined based on application of the ray casting operation on the 2D images 110A and the ground segment 308B of the 3D surface model 112A. In an embodiment, the correspondence information may be stored in the database 106.

In an example embodiment, the correspondence information may be a table 316A that includes the 2D pixel coordinates and the 3D surface coordinates corresponding to the 2D pixel coordinates. The correspondence table 316A may be used for projection of 3D polygons (e.g., a 3D cube around a 3D object) on the surface of the 3D surface model 112A. In the correspondence table 316A, the 2D pixel coordinates may include, for example, the width ($W_{2D}$) and height ($h_{2D}$) parameters (as shown). The 3D pixel coordinates may include the 3D information, for example, the horizontal distance ($X_{3D}$), vertical distance ($Y_{2D}$), and depth distance ($Z_{2D}$) parameters. The camera coordinate system or 2D pixel coordinates may be represented as $b_i \in \mathbb{R}^2$ and the 3D pixel coordinates may be represented as $a_i \in \mathbb{R}^3$.

At 318, an operation of polygon shaping may be executed. The polygons 318C (for example, 2D polygons or 3D polygons 318C) may include vertices and edges. The polygon shaping representation may include a type of projection with ground and non-ground vertices. For instance, the polygons 318C may be generated based on the ground vertices. Table. 1 represents a vertices table. The vertices table may include, for example, polygon ID, vertex ID, vertex type, and 3D pixel coordinates. Table. 2 represents an edge table. The edges may include, for example, polygon ID, Edge ID, vertex FROM ID, vertex TO ID. The vertex table may be referred as a primary table and the edge table may be referred as a secondary table.

TABLE 1

| Polygon ID | Vertex ID | Vertex Type | $x_{3D}$ | $y_{3D}$ | $z_{3D}$ |
|---|---|---|---|---|---|
| 0 | 0 | ground | 0.1315 | 0.0235 | 0.5105 |
| 0 | 1 | ground | 0.1315 | 0.0235 | 0.5131 |
| 0 | 2 | object | 0.6336 | 0.0315 | 0.3351 |

TABLE 2

| Polygon ID | Edge ID | Vertex FROM ID | Vertex TO ID |
|---|---|---|---|
| 0 | 0 | 0 | 1 |
| 0 | 1 | 1 | 5 |
| 0 | 2 | 5 | 6 |

The polygon ID, vertex ID, and vertex type are some of the attributes that can be used to describe and manipulate polygons. Polygon ID may be a unique identifier that may be assigned to each polygon 318C in an image. The polygon ID may be used to access, modify, or delete a specific polygon from a collection of polygons. For example, if an image contains multiple polygons, each polygon can be given a different ID, such as 1, 2, or 3. One can use the ID to select a polygon and change its color, position, or shape. The vertex ID may be a unique identifier that may be assigned to each vertex in a polygon. The vertex ID may be used to access, modify, or delete a specific vertex from a polygon. For example, if a polygon has four vertices, each vertex can be given a different ID, such as 1, 2, 3, or 4. One can use the ID to select a vertex and change its coordinates or add or remove edges from it. Vertex type may be a classification that indicates the role or function of a vertex in a polygon. Vertex type can be used to determine how a polygon is drawn, filled, or textured. For example, some common vertex types include a corner vertex that forms a sharp angle between two edges, a curve vertex that forms a smooth curve between two edges, a texture vertex that specifies the texture coordinates for a polygon, and the like. A 3D image 318A (obtained after polygon shaping) includes 3D polygons 318C on a ground segment 318B, which are shaped based on the correspondence table 316A.

At 320, a projection of 3D polygons 318C may be performed. The 3D polygons 318C may be projected onto a ground segment 318B of the projected 3D surface model 320A based on the correspondence information corresponding to one or more objects. Further, the projection may be performed further based on the vertex information and edge information. The polygon projection is described in FIG. 4, FIG. 5, FIG. 7, and FIG. 9.

Figure 4:
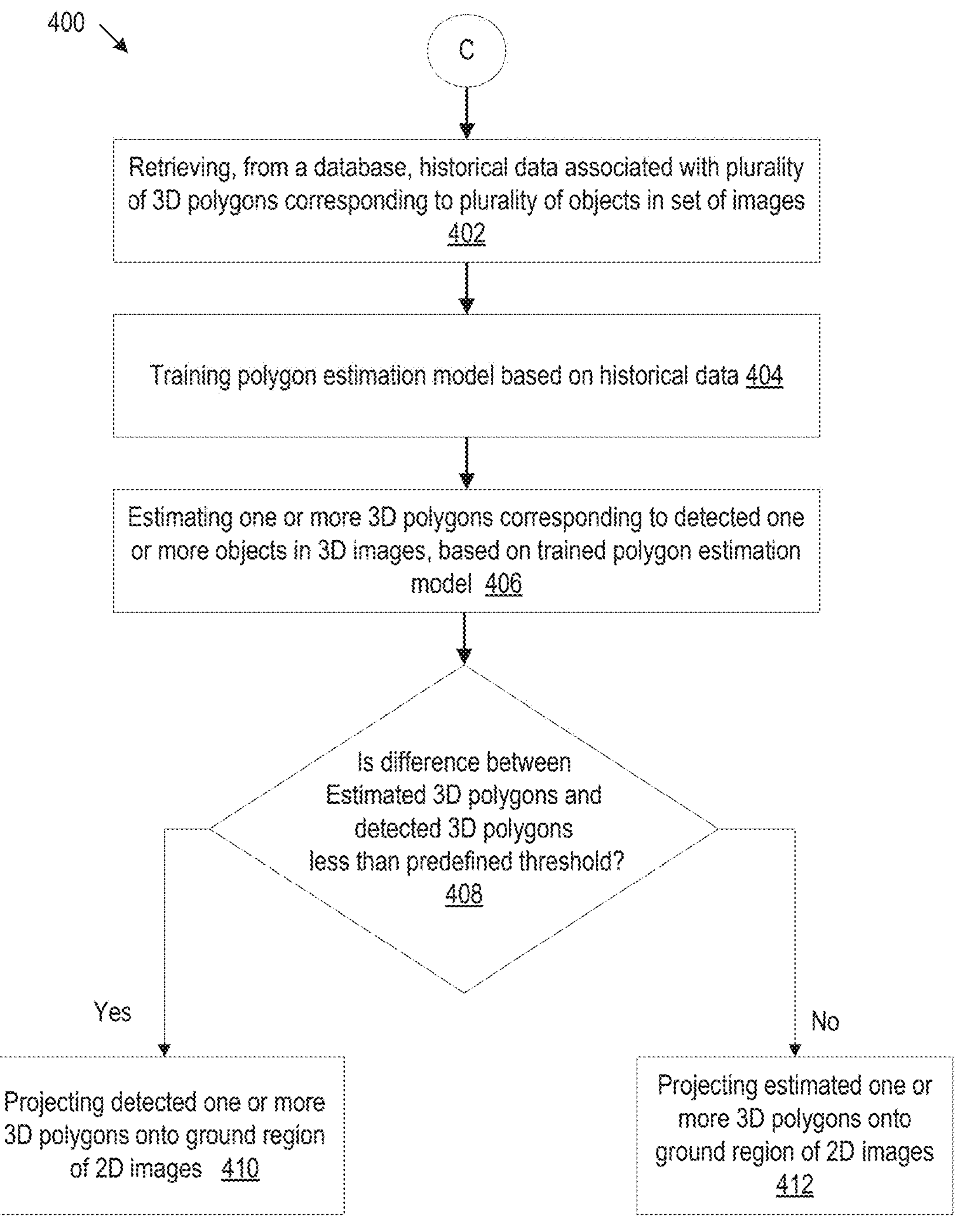
FIG. 4 is a diagram that illustrates a flowchart of an example method for estimation of 3D polygons corresponding to objects in 2D images.

FIG. 4 is a diagram that illustrates a flowchart of an example method for estimation of 3D polygons corresponding to objects in 2D images 110A, in accordance with an embodiment of the disclosure. FIG. 4 is described in conjunction with elements from FIG. 1, FIG. 2, and FIG. 3. With reference to FIG. 4, there is shown a flowchart 400. The method illustrated in the flowchart 400 may start at 402 and may be performed by any suitable system, apparatus, or device, such as, by the example electronic device 102 of FIG. 1, or the circuitry 206 of FIG. 2. Although illustrated with discrete blocks, the steps and operations associated with one or more of the blocks of the flowchart 400 may be divided into additional blocks, combined into fewer blocks, or eliminated, depending on the implementation.

At block 402, historical data associated with the 3D polygons corresponding to the objects in the 2D images 110A may be retrieved. The historical data may be stored in the database 106. Each 3D polygon may enclose a corresponding object of the plurality of objects. The historical data collection may be done through various known methods to examine historical images stored in the database 106, such as objects captured in the 2D images 110A or 3D images across various timeframes, different angles, and the like.

At block 404, polygon estimation model 208B may be trained based on the historical data.

At block 406, the 3D polygons may be estimated corresponding to detected objects. The objects may be detected based on the 3D polygons on the ground region of the 2D images 110A. The prediction of the behavioral data may involve use of machine learning to analyze how behavioral data of polygons in different scenarios, such as moving, rotating, or scaling. The polygon estimation model 208B may include a reinforcement learning (RL) framework, where an agent learns to control the polygons by interacting with an environment and receiving rewards or penalties based on the actions of the objects (corresponding to the 3D polygons).

The polygon estimation model 208B may optimize the behavioral data of the objects for different objectives, such as but not limited to, reaching a target, avoiding obstacles, or following a path. In an embodiment, a generative adversarial network (GAN) may be used to determine the behavioral data of the objects corresponding to the 3D polygons, where a generator tries to estimate a polygon behavior and a discriminator tries to distinguish between real and generated behaviors. Based on the behavioral data the estimation of 3D polygons may be performed. The generator may learn to generate diverse and natural polygon behaviors that match the data distribution. The predefined threshold value may vary based on the past instances of the objects behavior and may represent physical laws and human movements. For example, a predefined threshold value may be used to determine whether the object detector 208A has correctly identified an object in an image, based on the intersection over union (IoU) metric.

At block 408, a difference between the estimated 3D polygons corresponding to the detected objects may be estimated. When the difference between the estimated 3D polygons and the detected 3D polygons is less than a predefined threshold, then control may pass to 410. When the difference between the estimated 3D polygons and the detected 3D polygons is more than a predefined threshold, then control may pass to 412. The polygons may be further estimated to optimize the object detection, as the detected polygons may be inaccurate due to occlusions. Therefore, the estimated 3D polygons corresponding to the objects and the detected 3D polygons may be compared to determine a behavioral difference.

The threshold value may depend on the movement of objects, rotation, scales, or change of shape in previous images or videos. For example, when the object is a car, the threshold value may be higher when the car is moving fast or turning sharply, and lower when the car is moving slowly or staying still. This means that the threshold value may be based on rules or patterns that describe how the object behaves in the real world. For example, if the object is a person, the threshold value may be based on the human anatomy, posture, gesture, or facial expression. If the object is for example a ball, the threshold value may be based on the physics of motion, gravity, or friction. The projection of polygons is described in detail in exemplary FIG. 5, and FIG. 9.

At block 410, the detected 3D polygons may be projected onto the ground region of the 2D images 110A based on a determination that a difference between the estimated 3D polygons and the detected 3D polygons is less than a predefined threshold. Additionally, or alternatively, the projection of the detected 2D polygons may be used to project the polygons (or 3D polygons) onto the 3D surface model 112A.

In an embodiment, the detected 3D polygons may be dynamically detected based on the 2D images 110A. The 3D polygons estimated based on the historical data may be referred as the estimated polygons. The 3D polygons may include a depth in addition to other 2D parameters. The polygons may be estimated even if detected polygons can be obtained from the dynamic 2D image 110A because detected polygon may be inaccurate or missing due to the occlusions. In case of a human object, the estimated polygons may be learned from past instances and may broadly represent physical laws and human movement.

At block 412, the estimated 3D polygons may be projected onto the ground region of the 2D images 110A based on a determination that a difference between the estimated 3D polygons and the detected 3D polygons is more than a predefined threshold. Additionally, or alternatively, the projection of the estimated 3D polygons may be used to project the 3D polygons (or polygons) onto the 3D surface model 112A.

The estimated polygons may be estimated even if detected 3D polygons may be obtained from the dynamic 2D images 110A because detected 2D polygons may be inaccurate due to the occlusion. The estimated 3D polygons may be learned from past instances and broadly represent physical laws and human movement. Therefore, it is assumed that they will not deviate significantly compared to detected polygons based on fragmented information.

Figure 5:
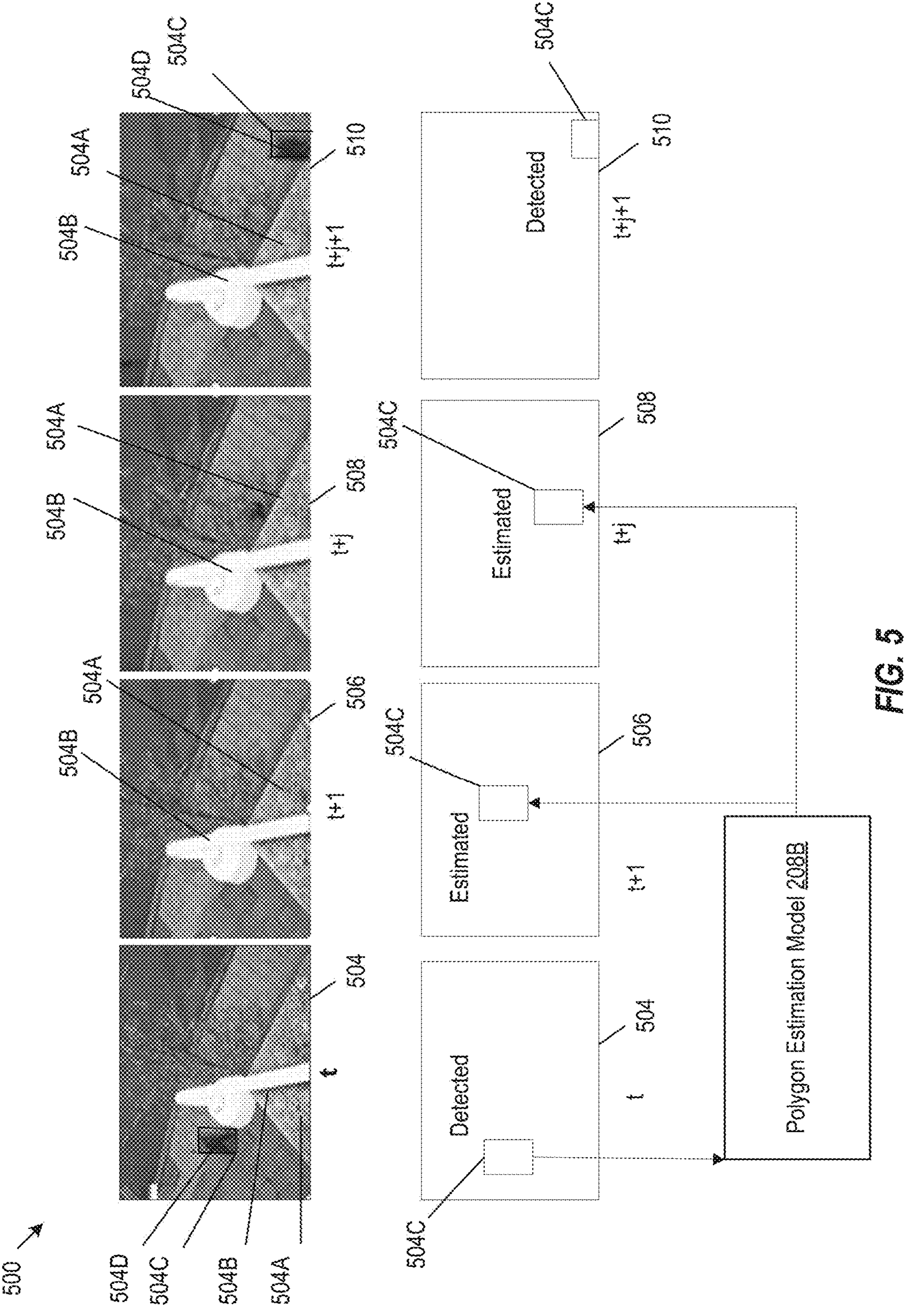
FIG. 5 is a diagram that illustrates an exemplary scenario for detection and estimation of 3D polygons.

FIG. 5 is a diagram that illustrates an exemplary scenario for estimation of 3D polygons, in accordance with an embodiment of the disclosure. FIG. 5 is described in conjunction with elements from FIG. 1, FIG. 2, FIG. 3, and FIG. 4. With reference to FIG. 5, there is shown the exemplary scenario 500. The method illustrated in the exemplary scenario 500 may be performed by any suitable system, apparatus, or device, such as, by the example electronic device 102 of FIG. 1 or circuitry 206 of FIG. 2.

Consider a set of image frames 504, 506, 508, and 510 (e.g., 2D images) as examples for determining behavioral data of the objects 504D across the set of frames 504, 506, 508, and 510. The number of image frames shown in FIG. 5 is presented merely as an example and such an example should not be construed as limiting the disclosure. The image frames 504, 506, 508, and 510 may include only one image frame or more than N image frames for determining the behavioral data, without deviation from the scope of the disclosure. For the sake of brevity, only four image frames are shown in FIG. 5. However, in some embodiments, there may be more than four image frames, without limiting the scope of the disclosure.

At frame 504, an object 504D may be detected. The number of objects shown in FIG. 5 is presented merely as an example. The object 504D may include only one object or more than one object, without deviation from the scope of the disclosure.

The first step is to determine the number of objects 504D within the set of image frames 504, 506, 508, and 510. The set of image frames 504, 506, 508, and 510 may be analyzed to determine the object of interest (e.g., the object 504D) or objects to be tracked for the behavioral data. The dynamic objects may be considered as the object of interest in the image frames 504, 506, 508, and 510 for determining the behavioral data in some embodiments. For the object 504D detected within the image frame 504, a 3D polygon 504C may be estimated at time 't'. The image frame 504 at time 't' may include multiple objects. For example, the image frame 504 may include a ground segment and the object 504D to be tracked for the behavioral data. The object 504D may be at a location 1 (the object may be enclosed by the 3D polygon 504C) in the image frame 504 at the time t. Consider the image frame 506 at time t+1, where image frame 506 may include occlusions 504A and 504B. The object 504D may now be detected at a second location in the second image frame 506, by considering behavioral data of the object. The polygon estimation model 208B may be pretrained using the historical data of the objects and may compensate the lack of polygons due to non-detection and inaccurate objects (at locations of the occlusions 504B, 504A in image frames 506, 508). The polygon ID, vertex ID, and vertex type are some of the attributes that can be used to describe and manipulate polygons. In an embodiment, each polygon may include vertices and edges and the information related to the vertices and edges may be stored in the form of table (Table. 1 and Table. 2 of FIG. 3). The table may include vertex information and the edge information.

In the image frame 508, the object 504D may be hidden behind the occlusion 504A and 504B at time t+j. The image frame 510 at time t+j+1 may be considered where the object 504D may be detected at time t+j+1. The object 504D corresponding to the 3D polygon 504C may be estimated for image frames 506 and 508 where the object 504D is not visible due to the occlusions 504B, 504A. The location of the estimated object 504D may be determined based on the behavioral data.

Figure 6:
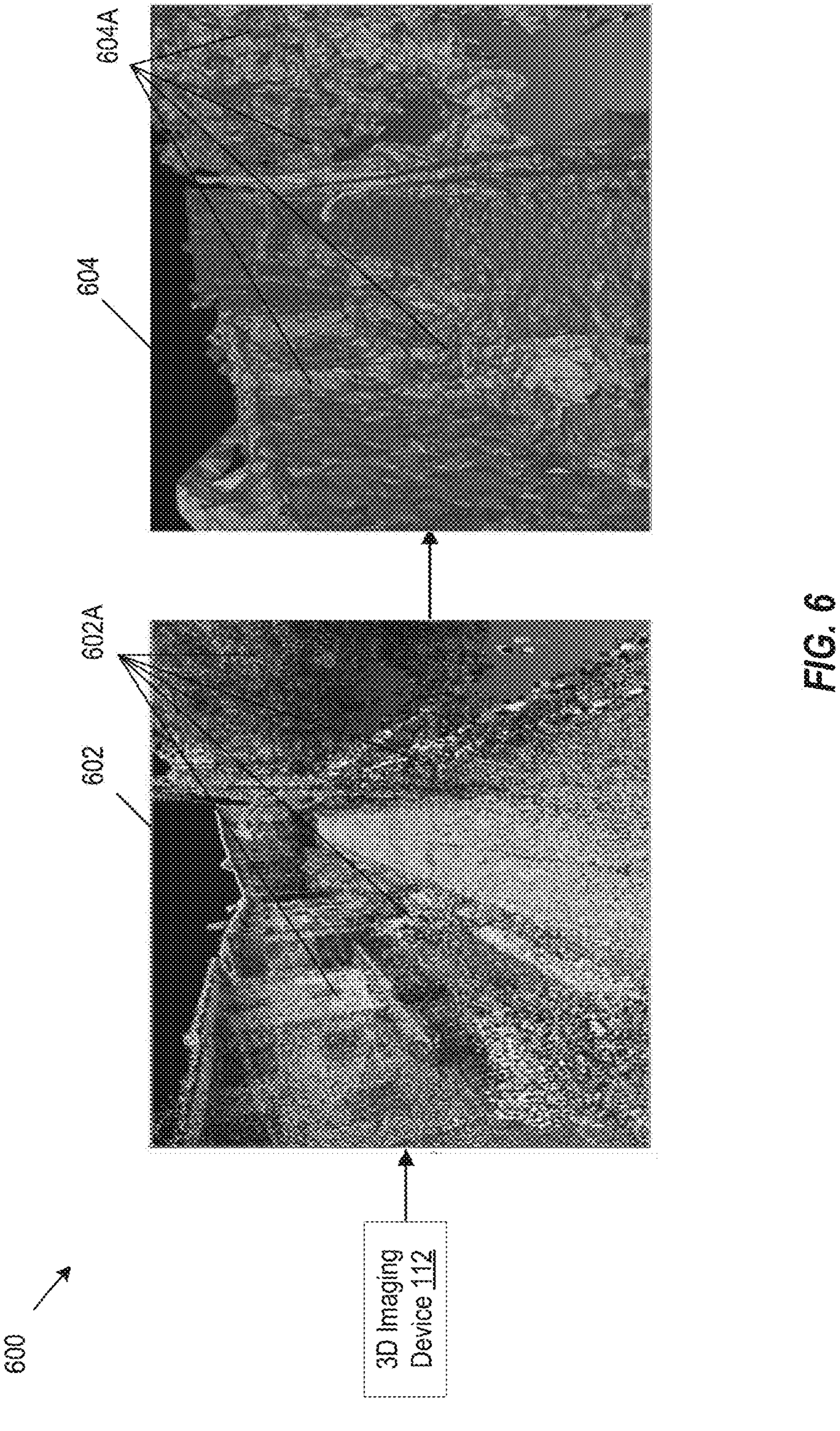
FIG. 6 is a diagram that illustrates an exemplary scenario for acquisition of 3D surface model.

FIG. 6 is a diagram that illustrates an exemplary scenario for acquisition of 3D surface model, in accordance with an embodiment of the disclosure. FIG. 6 is described in conjunction with elements from FIG. 1, FIG. 2, FIG. 3, FIG. 4, and FIG. 5. With reference to FIG. 6, there is shown an exemplary scenario 600. The method illustrated in the exemplary scenario 600 may be performed by any suitable system, apparatus, or device, such as, by the example electronic device 102 of FIG. 1 or the circuitry 206 of FIG. 2.

The scenario 600 may include the 3D imaging device 112. The 3D imaging device 112 may include suitable logic, circuitry, or interfaces, which may be configured to capture the 3D view of the real-world location (e.g., a street in a city). In accordance with an embodiment, the 3D imaging device 112 may include a plurality of image sensors (not shown) to capture the 3D view of the real-world location from multiple viewpoints. In accordance with an embodiment, the 3D imaging device 112 may be integrated into the electronic device 102. Examples of the 3D imaging device 112 may include, but are not limited to, LiDAR, a time-of-flight camera (ToF camera), stereoscopic camera system, structured-light 3D scanner, or CT scanner.

In an embodiment, the 3D imaging device 112 may be a LIDAR camera. The LiDAR camera may work by sending out rapid pulses of laser light and detecting the reflected light with a sensor. By scanning the laser beam across the scene, the LiDAR camera may create a 3D point cloud 602A of an object or a scene 602, which can be further processed into a 3D surface model image 604. For example, the 3D point cloud 602A may be converted to a surface model or mesh by application of a meshing operation on the 3D point cloud 602A. The 3D surface model image 604 may be referred to as a geometric data most often composed of a bunch of connected triangles (or polygons) that explicitly describe a surface. The 3D surface model image 604 may consist of vertices, edges, and faces that define the surface of the object. To generate the 3D surface model image 604 from the 3D point cloud 602A, different methods and algorithms, such as Poisson surface reconstruction, ball-pivoting algorithm, Delaunay triangulation, or marching cubes may be used.

Figure 7:
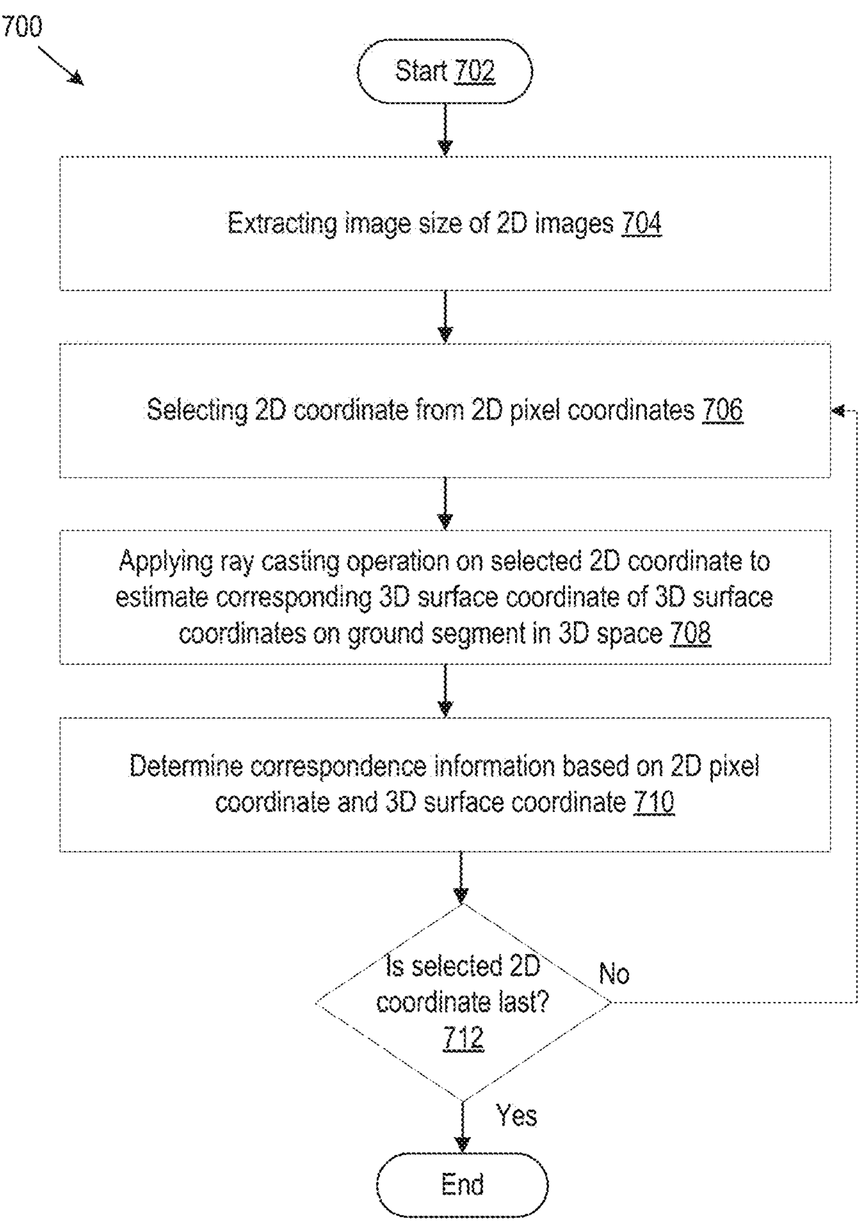
FIG. 7 is a diagram that illustrates a flowchart of an example for determination of correspondence information for dynamic multi-dimensional media content projection.

FIG. 7 is a diagram that illustrates a flowchart of an example for determination of correspondence information for dynamic multi-dimensional media content projection, in accordance with an embodiment of the disclosure. FIG. 7 is described in conjunction with elements from FIG. 1, FIG. 2, FIG. 3, FIG. 4, and FIG. 5. With reference to FIG. 7, there is shown an exemplary flowchart 700. The method illustrated in the exemplary flowchart 700 may be performed by any suitable system, apparatus, or device, such as, by the example electronic device 102 of FIG. 1, or the circuitry 206 of FIG. 2. Although illustrated with discrete blocks, the steps and operations associated with one or more of the blocks of the flowchart 700 may be divided into additional blocks, combined into fewer blocks, or eliminated, depending on the particular implementation.

At 704, an image size of the 2D images 110A may be extracted. The 2D images 110A may be provided as input for performing the image extraction. The 2D image 110A may be retrieved from the database 106 and the image size may be extracted based on dimensions of an image in terms of pixels, such as height and width. In another embodiment, image size may be extracted by dividing 2D images 110A into smaller patches of a fixed size and using the dimensions of each patch to extract the image size.

At 706, a 2D coordinate of a pixel from 2D pixel coordinates of the 2D images 110A may be selected. The 2D pixel coordinates may be considered as $X_{2D}$, $Y_{2D}$, wherein $X_{2D}$ is a position of a pixel along an x-axis and $Y_{2D}$ is a position of the pixel along a y-axis. As an example, the 2D coordinates of two pixels (ID1_2D and ID2_2D) may be represented as (x,y)=(305,656), (x,y)=(506, 656)

At 708, ray casting operation may be applied on the selected 2D coordinates to estimate a corresponding 3D surface coordinate on a ground segment of the 3D surface model 112A in the 3D space. The 3D surface coordinates may include the 3D pixel coordinates ($X_{3D}$, $Y_{3D}$, $Z_{3D}$). As an example, the 3D coordinates for the two pixels ID1_2D and ID2_3D are given below:

$$(x, y, z) = (0.1, 0.02, 0.21); (x, y, z) = (0.21, 0.5, 0.1); \ldots$$

At 710, correspondence information (e.g., the correspondence table 316A) may be determined based on 2D pixel coordinates and 3D surface coordinate. The 2D coordinate selection from 2D pixel coordinates may be a process of converting the pixel locations of the 2D image 110A to a different coordinate system, such as world coordinates, camera coordinates, or intrinsic coordinates. This can be useful for various applications, such as 3D surface model construction, image registration, or feature extraction.

At 712, it may be determined whether the selected 2D coordinate is the final coordinate of the 2D image. If the selected 2D coordinate is the final coordinate of the 2D image, control may pass to end. Otherwise, the control may pass to 706 and the next 2D coordinate from the 2D image may be selected. The process from 706 to 710 may be repeated for all the pixels of the 2D image.

Figure 8:
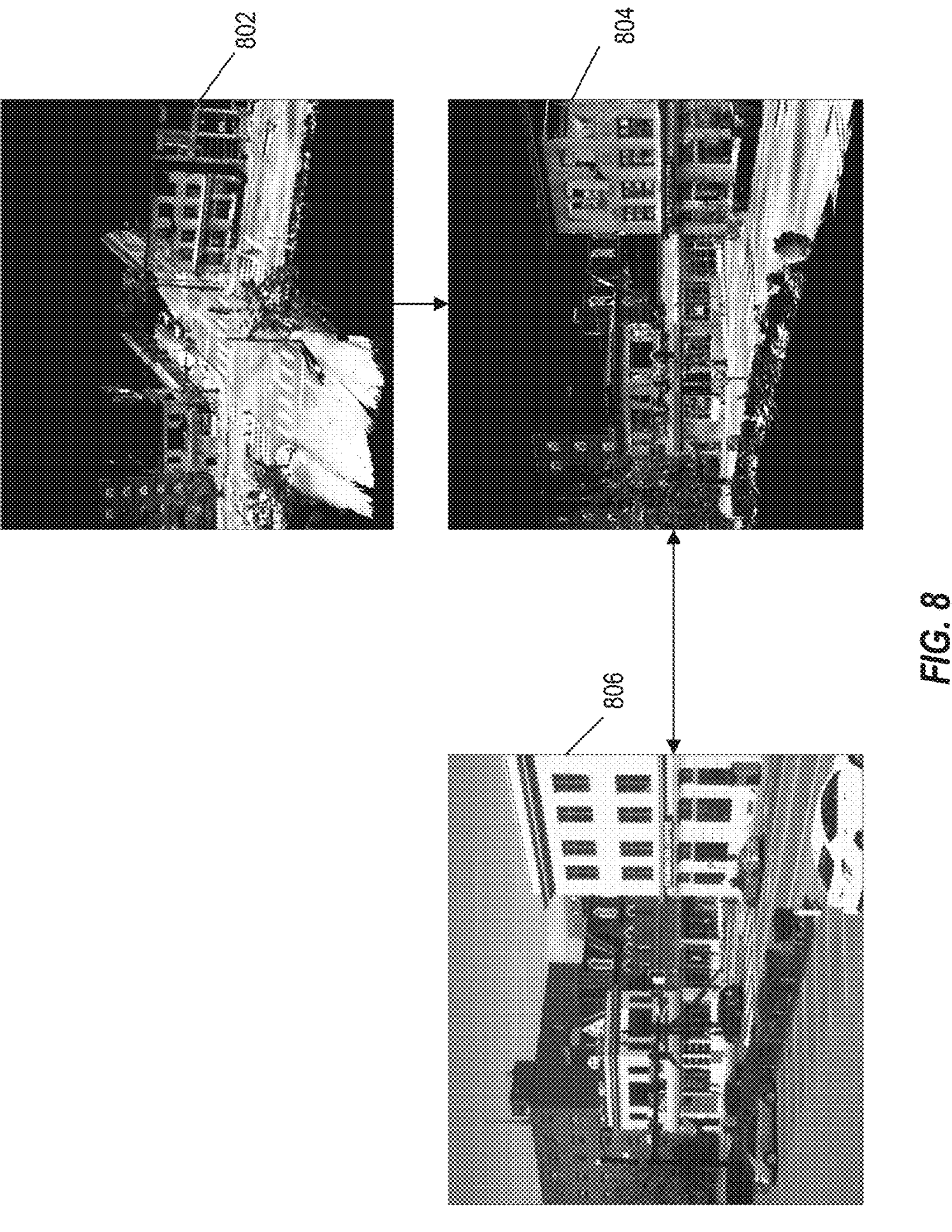
FIG. 8 is a diagram that illustrates an exemplary scenario for estimation of initial camera pose parameters corresponding to an initial view of the 3D surface model in a 3D space.

FIG. 8 is a diagram that illustrates an exemplary scenario for estimation of initial camera pose parameters corresponding to an initial view of the 3D surface model in a 3D space, in accordance with an embodiment of the disclosure. FIG. 8 is described in conjunction with elements from FIG. 1, FIG. 2, FIG. 3, FIG. 4, FIG. 5, FIG. 6, and FIG. 7. With reference to FIG. 8, there is shown an exemplary scenario 800. In the exemplary scenario 800, there is shown an initial view 802 of the 3D surface model, a final view 804 of the 3D surface model (after alignment), and a base 2D image 806. To align the initial view 802 of the 3D surface model with a view of the base 2D image 806, the circuitry 206 may estimate initial camera pose parameters corresponding to the initial view 802 of the 3D surface model in a 3D space. Thereafter, the circuitry 206 may iteratively optimize the initial camera pose parameters to align the initial view 802 of the 3D surface model to the view of the base 2D image 806. After the alignment, the final view 804 of the 3D surface model may match the view of the base 2D image 806.

Figure 9:
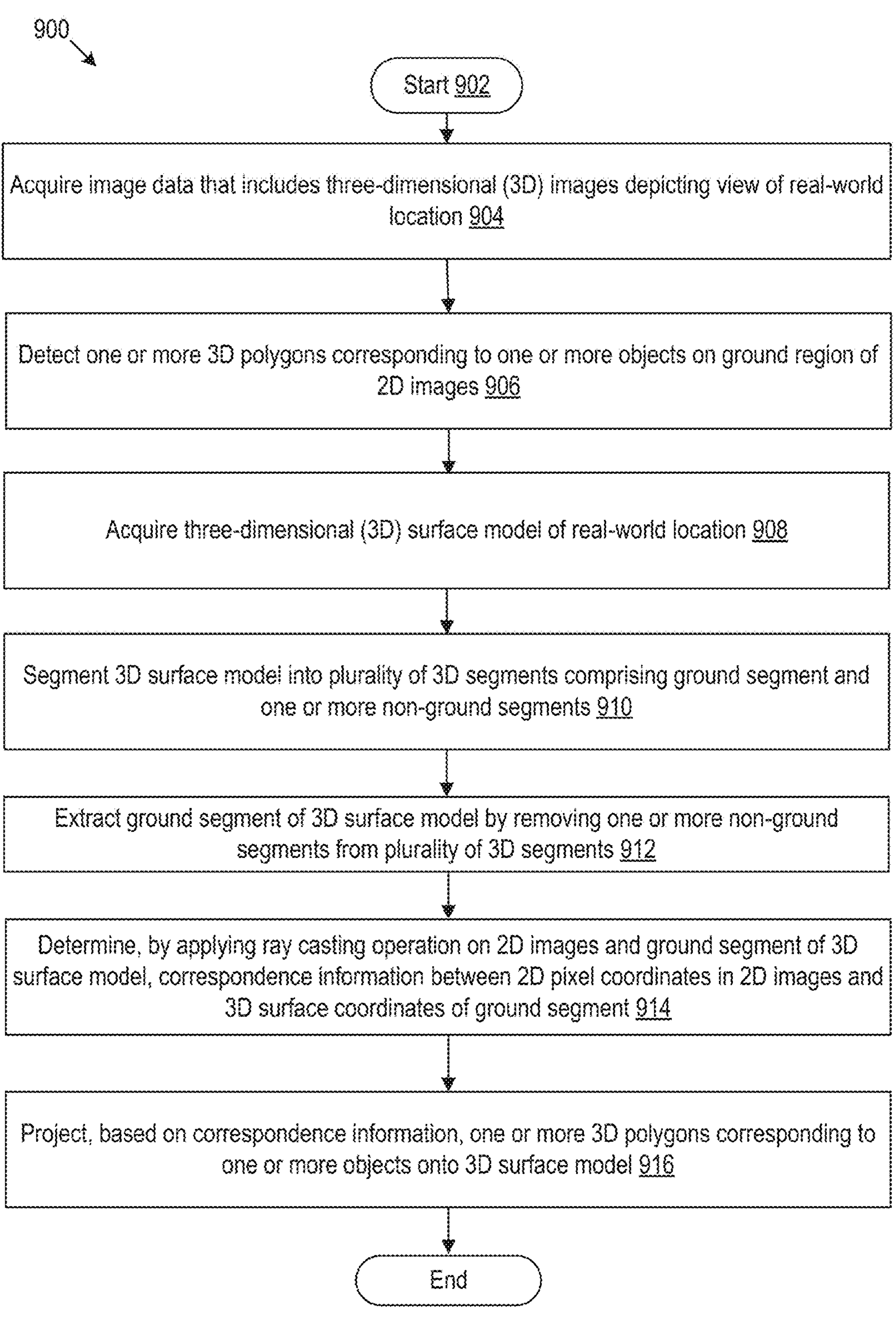
FIG. 9 is a diagram that illustrates a flowchart of an example for dynamic multi-dimensional media content projection, all according to at least one embodiment described in the present disclosure.

FIG. 9 is a diagram that illustrates a flowchart of an example for dynamic multi-dimensional media content projection, in accordance with an embodiment of the disclosure. FIG. 9 is explained in conjunction with elements from FIG. 1, FIG. 2, FIG. 3A, FIG. 3B, FIG. 4, FIG. 5, FIG. 6, FIG. 7, and FIG. 8. With reference to FIG. 9, there is shown a flowchart 900. The operations from 902 to 916 may be implemented by any computing system, such as, by the electronic device 102, or the circuitry 206 of the electronic device 102 of FIG. 1. The operations may start at 902 and may proceed to 904.

At 904, image data including the 2D images 110A depicting view of real-world location may be acquired. The 2D images 110A may be any digital data, which can be rendered, streamed, broadcasted, or stored on any electronic device or storage. Examples of the 2D images 110A may include, but are not limited to, images (such as overlay graphics), real world images captured by imaging devices, or audio/video data.

At 906, the 3D polygons corresponding to objects may be detected on a ground region of the 2D images 110A. The polygons may be 3D polygons with straight sides that form a closed area. The polygons may include a cube, a cuboid, and so on. The vertices, edges, and faces of these polygons may be defined using points (Pt) with x, y, and z coordinates.

The polygon generation may be a process that involves creating a set of points to define the boundaries of the objects or region of interest in the images or videos. The points, or vertices may be connected by straight lines to form a polygon that surrounds the object or region, taking its shape. For example, the vertices may be generated from bounding box coordinates by selecting four points on a perimeter of a rectangular bounding box and using such points as the polygon vertices.

At 908, 3D surface model 208C of real-world location may be acquired. The 3D surface model 112A may be a digital representation of features in three-dimensional space. Some examples of 3D surfaces may be landscape, an urban corridor, gas deposits under the earth, and a network of well depths and the like to determine water table depth. The 3D surface model 112A may be created from a variety of data sources, such as points, lines, polygons, or images, using interpolation or triangulation methods.

In an embodiment, initial camera pose parameters may be estimated corresponding to an initial view of the 3D surface model 208C in a 3D space. The initial camera pose parameters may be optimized to align a view of the 3D surface model 208C to a view of the 2D images 110A.

At 910, the 3D surface model 112A may be segmented into 3D segments including ground segment and one or more non ground segments. In some embodiments, various techniques, and algorithms, such as but not limited to, thresholding, clustering, edge detection, region growing, graph-based methods, or deep learning models may be used to perform model segmentation. Additionally, or alternatively, the segmentation may be performed by acquiring the 2D images 110A having multiple ground segments such as roads and non-ground segments such as buildings. The 2D images 110A may be collected for example, traffic surveillance images featuring the multiple objects. The collected 2D images 110A may be annotated. This involves drawing bounding boxes around the objects of interest in each 2D image 110A and labeling them. The objects of interest may be, for example, ground segments 312B. For instance, a bounding box may be drawn around the ground segment and labeled as 'ground'. The annotated 2D images 110A may be used to train a machine learning model. The model may learn to recognize the features of each object from the annotated images.

In an embodiment, the acquisition of the 3D surface model 112A may include capturing of 3D data via image capturing device to generate a 3D point cloud based on the 3D data. The point cloud data may be converted into the 3D surface model 208C.

At 912, ground segment of 3D surface model 112A may be extracted by removing one or more non-ground segments from the plurality of 3D segments.

At 914, correspondence information between 2D pixel coordinates in 2D images 110A and 3D surface coordinates of the ground segment may be determined by applying ray casting operation on 2D images 110A and the ground segment of 3D surface model 112A. The ray casting operation may be applied on the selected 2D coordinates to estimate corresponding 3D surface coordinates on the ground segment in the 3D space.

In an example embodiment, the correspondence information may be a table 316A that includes the 2D pixel coordinates and the 3D surface coordinates corresponding to the 2D pixel coordinates. The correspondence table 316A may be useful to quickly transfer the polygon data from 2D to 3D coordinates on the ground segment of the 3D surface model 208C.

At 916, one or more 3D polygons corresponding to objects may be projected onto the 3D surface model 208C based on correspondence information. In an embodiment, each 3D polygon of the one or more 3D polygons may enclose a corresponding object of the plurality of objects in the 3D space of the 3D surface model 208C. Vertex information including a mapping of the 3D surface coordinates with vertices of the one or more 3D polygons may be generated. Edge information may be generated to include a mapping of the vertices to edges of the one or more 3D polygons. The projection may be performed further based on the vertex information and the edge information. The vertex information may include a primary table that includes a vertex ID, a polygon ID, a vertex type, and the 3D surface coordinates, and the edge information may include a secondary table that includes the polygon ID, an edge ID, and IDs of edge vertices. The vertex type may include one of a ground or an object.

In an embodiment, the projection of the polygons may include retrieving historical data associated with the 3D polygons corresponding to the objects in of the 2D images 110A or 3D surface model 112A. Each 3D polygon encloses a corresponding object of the plurality of objects. The polygon estimation model 208B may be trained based on the historical data. Based on the trained polygon estimation model 208B, 3D polygons may be estimated corresponding to the detected objects in 2D images 110A. The detected 3D polygons may be projected onto the ground region of the 2D images 110A based on the determination that the difference between the estimated 3D polygons and the detected 3D polygons is less than the predefined threshold. The estimated 3D polygons may be projected onto the ground region of the 2D images 110A based on the determination that a difference between the estimated 3D polygons and the detected 3D polygons is greater than the predefined threshold.

A person with ordinary skill in the art will understand that the scope of the disclosure is not limited to 2D images/3D images. In accordance with an embodiment, 2D and 3D images may be any data such as videos, moving pictures and the like. without departure from the scope of the disclosure.

Various embodiments of the disclosure may provide one or more non-transitory computer-readable storage media configured to store instructions that, in response to being executed, cause a system (such as, the example electronic device 102) to perform operations. The operations may include acquiring image data (for example, 2D image data) that includes two-dimensional (2D) images depicting a view of a real-world location (for example, a live recording received from a CCTV camera). The operations may comprise detecting one or more 2D polygons corresponding to one or more objects on a ground region of the 2D images and acquiring a 3D surface model of the real-world location. The set of operations may further include segmenting the 3D surface model into a plurality of 3D segments comprising a ground segment and one or more non-ground segments from the plurality of 3D segments. The set of operations may further comprise determining, by applying a ray casting operation on the 2D images and the ground segment of the 3D surface model, correspondence information between 2D pixel coordinates in the 2D images and 3D surface coordinates of the ground segment, and projecting, based on the correspondence information, one or more 3D polygons corresponding to the one or more objects onto the 3D surface model.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the electronic device 102. In some embodiments, the different components, modules, engines, and services described in the present disclosure may be implemented as objects or processes that execute on the electronic device 102 (e.g., as separate threads). While some of the system and methods described in the present disclosure are described as being implemented in software (stored on and/or executed by general purpose hardware), specific hardware implementations or a combination of software and specific hardware implementations are also possible and contemplated. In this description, a "computing entity" may be any electronic device 102 as previously defined in the present disclosure, or any module or combination of modulates running on the electronic device 102.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, executed by a processor in an electronic device, comprising:

acquiring image data that includes two-dimensional (2D) images depicting a view of a real-world location;

detecting one or more 3D polygons corresponding to one or more objects on a ground region of the 2D images;

acquiring a three-dimensional (3D) surface model of the real-world location;

segmenting the 3D surface model into a plurality of 3D segments comprising a ground segment and one or more non-ground segments; and extracting the ground segment of the 3D surface model by removing the one or more non-ground segments from the plurality of 3D segments;

determining, by applying a ray casting operation on the 2D images and the ground segment of the 3D surface model, correspondence information between 2D pixel coordinates in the 2D images and 3D surface coordinates of the ground segment; and projecting, based on the correspondence information, the one or more 3D polygons corresponding to the one or more objects onto the 3D surface model;

wherein the correspondence information includes a table that includes the 2D pixel coordinates and the 3D surface coordinates corresponding to the 2D pixel coordinates.

2. The method according to claim 1, further comprising:

estimating initial camera pose parameters corresponding to an initial view of the 3D surface model in a 3D space; and optimizing the initial camera pose parameters to align a view of the 3D surface model to a view of the 2D images.

3. The method according to claim 1, further comprising:

generating vertex information that includes a mapping of the 3D surface coordinates with vertices of the one or more 3D polygons; and generating edge information that includes a mapping of the vertices to edges of the one or more 3D polygons;

wherein the projection of the one or more 3D polygons is performed further based on the vertex information and the edge information.

4. The method according to claim 3, wherein the vertex information includes a primary table that includes a vertex ID, and a polygon ID, a vertex type, and the 3D surface coordinates, and the edge information includes a secondary table that includes the polygon ID, an edge ID, and IDs of edge vertices.

5. The method according to claim 3, wherein the vertex type includes one of a ground or an object.

6. The method according to claim 1, wherein each 3D polygon of the one or more 3D polygons encloses a corresponding object of the plurality of objects in a 3D space of the 3D surface model.

7. The method according to claim 1, further comprising:

retrieving, from a database, historical data associated with a plurality of 2D polygons corresponding to a plurality of objects in a set of images, wherein each 3D polygon of the plurality of 3D polygon encloses a corresponding object of the plurality of objects;

training a polygon estimation model based on the historical data;

estimating one or more 3D polygons corresponding to the detected one or more objects in the 2D images, based on the trained polygon estimation model; and projecting the detected one or more 3D polygons onto the ground region of the 2D images based on a determination that a difference between the estimated one or more 3D polygons and the detected one or more 3D polygons is less than a predefined threshold.

8. The method according to claim 7, further comprising projecting the estimated one or more 3D polygons onto the ground region of the 2D images based on a determination that a difference between the estimated one or more 3D polygons and the detected one or more 3D polygons is greater than the predefined threshold.

9. The method according to claim 1, wherein the determining of the correspondence information includes:

extracting an image size of the 2D images;

selecting a 2D coordinate from 2D pixel coordinates;

applying the ray casting operation on the selected 2D coordinate to estimate a corresponding 3D surface coordinate of the 3D surface coordinates on the ground segment in a 3D space; and determine the correspondence information based on the 2D pixel coordinate and the 3D surface coordinate.

10. The method according to claim 1, wherein the acquiring of the 3D surface model further includes:

capturing 3D data via an image capturing device;

generating a 3D point cloud based on the 3D data; and converting the point cloud data into the 3D surface model.

11. One or more non-transitory computer-readable storage media configured to store instructions that, in response to being executed, cause an electronic device to perform operations, the operations comprising:

acquiring image data that includes two-dimensional (2D) images depicting a view of a real-world location;

detecting one or more 3D polygons corresponding to one or more objects on a ground region of the 2D images;

acquiring a three-dimensional (3D) surface model of the real-world location;

segmenting the 3D surface model into a plurality of 3D segments comprising a ground segment and one or more non-ground segments; and extracting the ground segment of the 3D surface model by removing the one or more non-ground segments from the plurality of 3D segments;

determining, by applying a ray casting operation on the 2D images and the ground segment of the 3D surface model, correspondence information between 2D pixel coordinates in the 2D images and 3D surface coordinates of the ground segment; and projecting, based on the correspondence information, the one or more 3D polygons corresponding to the one or more objects onto the 3D surface model;

wherein the correspondence information includes a table that includes the 2D pixel coordinates and the 3D surface coordinates corresponding to the 2D pixel coordinates.

12. The one or more non-transitory computer-readable storage media according to claim 11, wherein the operations further comprises:

estimating initial camera pose parameters corresponding to an initial view of the 3D surface model in a 3D space; and optimizing the initial camera pose parameters to align a view of the 3D surface model to a view of the 2D images.

13. The one or more non-transitory computer-readable storage media according to claim 11, wherein the operations further comprises:

generating vertex information that includes a mapping of the 3D surface coordinates with vertices of the one or more 3D polygons;

generating edge information that includes a mapping of the vertices to edges of the one or more 3D polygons, wherein the projection is performed further based on the vertex information and the edge information.

14. The one or more non-transitory computer-readable storage media according to claim 13, wherein the vertex information includes a primary table that includes a vertex ID, and a polygon ID, a vertex type, and the 3D surface coordinates, and the edge information includes a secondary table that includes the polygon ID, an edge ID, and IDs of edge vertices.

15. The one or more non-transitory computer-readable storage media according to claim 11, further comprising:

retrieving, from a database, historical data associated with a plurality of 3D polygons corresponding to a plurality of objects in a set of images, wherein each 3D polygon of the plurality of 3D polygon encloses a corresponding object of the plurality of objects;

training a polygon estimation model based on the historical data;

estimating one or more 3D polygons corresponding to the detected one or more objects in the 2D images, based on the trained polygon estimation model; and projecting the detected one or more 3D polygons onto the ground region of the 2D images based on a determination that a difference between the estimated one or more 3D polygons and the detected one or more 3D polygons is less than a predefined threshold.

16. The one or more non-transitory computer-readable storage media according to claim 11, wherein the operations further comprises:

extracting an image size of the 2D images;

selecting a 2D coordinate from 2D pixel coordinates;

applying the ray casting operation on the selected 2D coordinate to estimate a corresponding 3D surface coordinate of the 3D surface coordinates on the ground segment in a 3D space; and determining the correspondence information based on the 2D pixel coordinate and the 3D surface coordinate.

17. The one or more non-transitory computer-readable storage media according to claim 11, wherein the operations further comprises:

capturing 3D data via an image capturing device;

generating a 3D point cloud based on the 3D data; and converting the point cloud data into the 3D surface model.

18. An electronic device, comprising:

a memory configured to store instructions; and a processor, coupled to the memory, configured to execute the instructions to perform a process comprising:

acquiring image data that includes two-dimensional (2D) images depicting a view of a real-world location;

detecting one or more 3D polygons corresponding to one or more objects on a ground region of the 2D images;

acquiring a three-dimensional (3D) surface model of the real-world location;

segmenting the 3D surface model into a plurality of 3D segments comprising a ground segment and one or more non-ground segments;

extracting the ground segment of the 3D surface model by removing the one or more non-ground segments from the plurality of 3D segments;

determining, by applying a ray casting operation on the 2D images and the ground segment of the 3D surface model, correspondence information between 2D pixel coordinates in the 2D images and 3D surface coordinates of the ground segment; and projecting, based on the correspondence information, the one or more 3D polygons corresponding to the one or more objects onto the 3D surface model;

wherein the correspondence information includes a table that includes the 2D pixel coordinates and the 3D surface coordinates corresponding to the 2D pixel coordinates.

* * * * *